May 8, 1923.                                                1,454,685
P. MUELLER
EGG CANDLING DEVICE
Filed May 26, 1921          2 Sheets-Sheet 1

Inventor
P. Mueller
By
Attorney

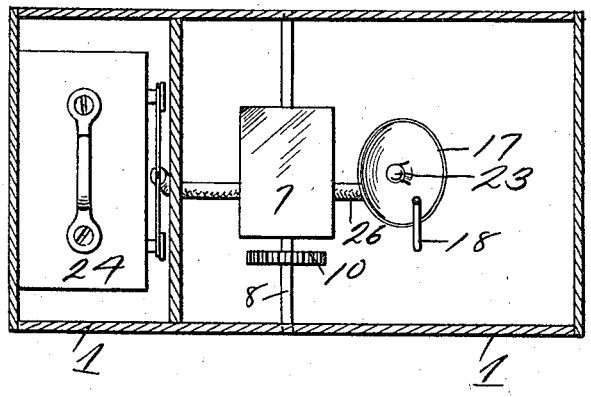
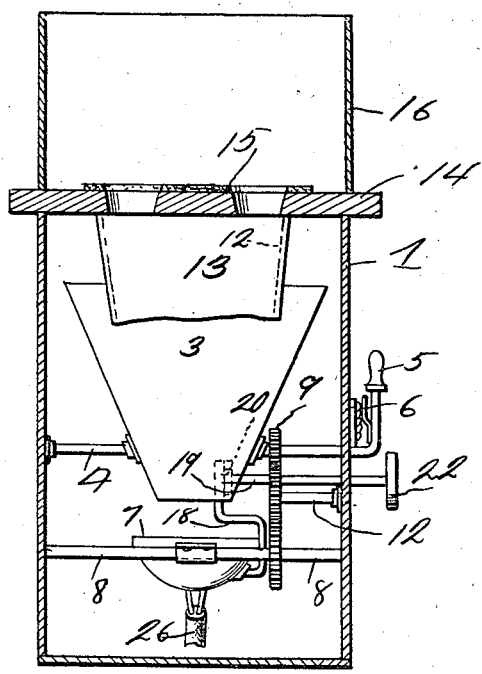
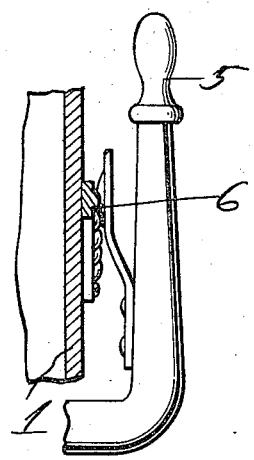

Patented May 8, 1923.

1,454,685

UNITED STATES PATENT OFFICE.

PAUL MUELLER, OF ASHTON, IOWA.

EGG-CANDLING DEVICE.

Application filed May 26, 1921. Serial No. 472,651.

*To all whom it may concern:*

Be it known that I, PAUL MUELLER, a citizen of the United States, residing at Ashton, in the county of Osceola, State of Iowa, have invented a new and useful Egg-Candling Device; and I do hereby declare the following to be a full, clear, and exact description of the invention, such as will enable others skilled in the art to which it appertains to make and use the same.

The invention relates to egg candling devices and has for its object to provide a device of this character whereby the sun's rays may be utilized for candling eggs, thereby obviating the expensive use of artificial light. Also to provide means comprising a convexed glass and a movable cone for concentrating the rays upon an adjustable mirror, which mirror deflects the concentrated rays through passages in the upper ends of which are disposed eggs.

A further object is to provide means whereby the cone may be adjusted to various angles according to the altitude of the sun and the mirror automatically adjusted when the cone is adjusted to position.

A further object is to provide means whereby an artificial light, such for instance as an electric light may be moved into position for reflecting light rays through passages leading to the eggs thereby allowing the candling device to be used when the sun is obscured.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 3 is a horizontal sectional view taken on line 3—3 of Figure 1.

Figure 4 is a vertical sectional view taken on line 4—4 of Figure 1.

Figure 5 is a detail sectional view showing lever and detent means for controlling the same.

Figure 1:
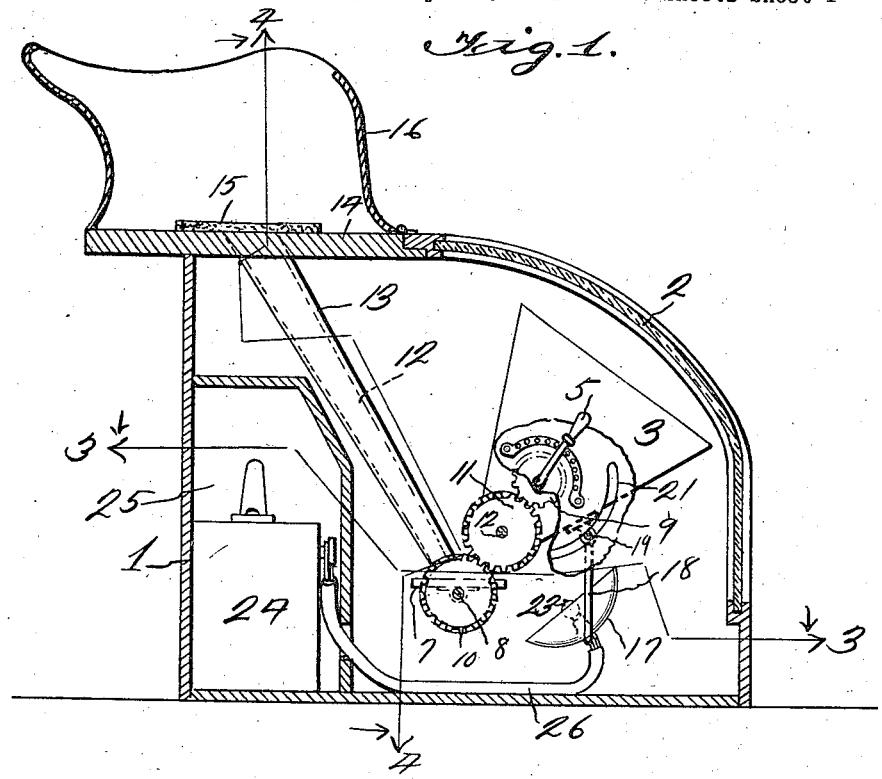
Figure 1 is a vertical longitudinal sectional view through a candling device.
Figure 2:
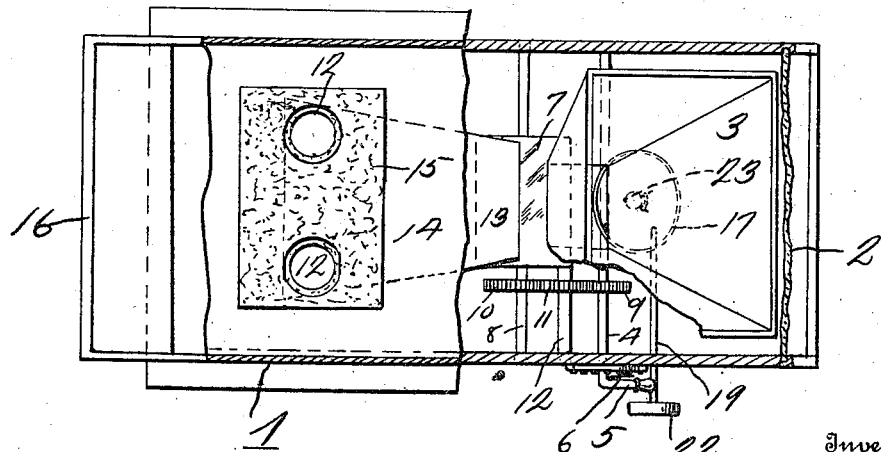
Figure 2 is a top plan view of the candling device, parts being broken away to better illustrate the structure.

Referring to the drawings, the numeral 1 designates a casing and 2 a convexed glass carried thereby and through which glass the sun's rays pass and are concentrated in the pivoted cone 3 which is mounted on the transversely disposed shaft 4 and controllable through the lever 5 and detent 6. The operator may adjust the cone 3 to various positions incident to the altitude of the sun at various times of the day. The rays of the sun are concentrated and reflected on a pivoted mirror 7, which is mounted on a transversely disposed shaft 8, said mirror being geared to a gear 9 carried by the shaft 4 through the medium of the gear 10 and the idle gear 11 which idle gear 11 is rotatably mounted on a stub shaft 12. It will be seen that when the cone 3 is rocked by the rotation of the shaft 4 that the mirror 7 will be automatically changed in position and to the proper angle for reflecting the rays through the light passages 12 of the chute 13. The light passages 12 extend through the top 14 of the casing 1 and are preferably round so that an egg will easily rest therein. If so desired padding 15 may be provided for preventing damage to the egg incident to placing and removing the same from position during a candling operation. Extending upwardly from the top 14 of the casing 1 is a metallic shield 16 for shielding the eyes from the light during an examination of the eggs. Shield 16 may be in the form of any material, preferably metallic and nickel plated.

Disposed within the casing 1 is an electric light reflector 17, which reflector is carried by a downwardly extending arm 18 of a shaft 19, which shaft is rockably mounted in a bearing 20 carried by the cone 3 and extends through an arcuate slot 21 in one side of the casing 1 and is provided with a finger engaging member 22, by means of which member the electric light reflector 17 may be moved to a position where its bulb 23 will reflect directly into the light passages 12. By providing the light 23, it will be seen that means is provided whereby the candling device can be used on dark days, or in places where access to the sunlight is impossible. Current may be supplied to the electric bulb 23 from a battery 24, disposed within the casing 1 and preferably in a separate compartment 25, and from which battery electric wires 26 lead to the electric bulb 23. The interior of the casing is preferably painted white and the cone 3 preferably formed of nickel-plated metal for obtaining the best results.

From the above it will be seen that an egg candling device is provided which may be operated through the medium of sun's rays or by artificial light. It will also be seen that the operation is positive and the parts have been reduced to a minimum, thereby allowing the device to be cheaply constructed.

The invention having been set forth what is claimed as new and useful is:—

1. An egg candling device comprising a casing, an inclined light passage in said casing, a reflecting cone having its apex end disposed adjacent the lower end of the inclined passage, said reflecting cone being pivotally mounted in the casing, a convexed glass disposed adjacent the upper end of said cone, a mirror disposed below the apex end of the cone and the lower end of the light passage and means for simultaneously adjusting the mirror upon a movement of the reflecting cone.

2. An egg candling device comprising a casing, an inclined light passage in said casing, a reflecting cone having its apex end disposed adjacent the lower end of the inclined passage, said reflecting cone being pivotally mounted in the casing, a convexed glass disposed adjacent the upper end of said cone, a pivoted mirror disposed below the apex end of the cone and the lower end of the light passage, gear means between the pivoted mirror and the pivoted cone whereby they will simultaneously move upon movement of the cone and means for holding said cone in various positions to which it may have been moved.

3. An egg candling device comprising a casing, an inclined light passage in said casing, a reflecting cone having its apex end disposed adjacent the lower end of the inclined passage, said reflecting cone being pivotally mounted in the casing, a convexed glass disposed adjacent the upper end of said cone, a pivoted mirror disposed below the apex end of the cone and the lower end of the light passage, means whereby when the pivoted cone is moved said mirror will simultaneously move, and means whereby a light may be disposed adjacent the lower end of the inclined light passage in the casing.

In testimony whereof I have signed my name to this specification in the presence of two subscribing witnesses.

PAUL MUELLER.

Witnesses:
W. J. JOHANNES,
R. M. YAPPEN.